(12) United States Patent
Lu et al.

(10) Patent No.: US 10,572,333 B2
(45) Date of Patent: Feb. 25, 2020

(54) ELECTRONIC DEVICE AND METHOD FOR DIAGNOSING FAULTS

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Xin Lu, Shenzhen (CN); Huan-Huan Zhang, Shenzhen (CN); Hui-Feng Liu, Shenzhen (CN); Yu-Yong Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 148 days.

(21) Appl. No.: 15/860,673

(22) Filed: Jan. 3, 2018

(65) Prior Publication Data
US 2019/0034255 A1   Jan. 31, 2019

(30) Foreign Application Priority Data
Jul. 25, 2017   (CN) .......................... 2017 1 0611753

(51) Int. Cl.
| G06F 11/07 | (2006.01) |
| G06F 7/08 | (2006.01) |
| G06N 7/00 | (2006.01) |
| G06N 5/04 | (2006.01) |
| G06F 16/22 | (2019.01) |
| G06N 5/00 | (2006.01) |
| G06N 20/00 | (2019.01) |

(52) U.S. Cl.
CPC .............. *G06F 11/079* (2013.01); *G06F 7/08* (2013.01); *G06F 11/0781* (2013.01); *G06F 16/22* (2019.01); *G06N 5/003* (2013.01); *G06N 5/045* (2013.01); *G06N 7/005* (2013.01); *G06N 20/00* (2019.01)

(58) Field of Classification Search
CPC .............. G06F 11/079; G06F 11/0793; G06F 11/0751; G06F 11/0709; G06F 11/0742; G06F 11/0772; G06F 11/0787; G06F 11/3409; G06F 11/3452; G06F 11/3664; G06F 11/3688
See application file for complete search history.

(56) References Cited

U.S. PATENT DOCUMENTS

| 6,397,247 | B1 * | 5/2002 | Shirakawa | G06F 11/0748 |
| | | | | 709/203 |
| 7,051,044 | B1 * | 5/2006 | Fera | B61L 27/0094 |
| 8,015,453 | B2 * | 9/2011 | Lee | G06F 11/0793 |
| | | | | 714/38.1 |
| 10,241,852 | B2 * | 3/2019 | Hofig | G06F 11/079 |
| 2016/0358106 | A1 * | 12/2016 | Anderson | G06N 7/005 |
| 2017/0177424 | A1 * | 6/2017 | Guay | G06F 11/008 |
| 2017/0185470 | A1 * | 6/2017 | Hofig | G06F 11/0769 |

* cited by examiner

*Primary Examiner* — Nadeem Iqbal
(74) *Attorney, Agent, or Firm* — ScienBiziP, P.C.

(57) ABSTRACT

A method for diagnosing faults in products of one type includes determining a fault type of the products and all of the underlying reasons for the fault which correspond to the fault type. A probability of each underlying reason is calculated and a decision tree is constructed, a root node of the decision tree being the determined fault type and all the underlying reasons being child nodes of the root node. When the decision tree is solved, the underlying reasons for the fault of that type of product can be presented.

12 Claims, 4 Drawing Sheets

ELECTRONIC DEVICE AND METHOD FOR DIAGNOSING FAULTS

CROSS-REFERENCE TO RELATED APPLICATIONS

This application claims priority to Chinese Patent Application No. 201710611753.X filed on Jul. 25, 2017, the contents of which are incorporated by reference herein.

FIELD

The subject matter herein generally relates to fault diagnosis technology, and particularly to an electronic device and a method for diagnosing faults using the electronic device.

BACKGROUND

Mobile phones are widespread, production of such electronic devices is scaling up, and production efficiency is more demanding. At present, when the electronic device fails, a user may analyze the failure of the electronic device by checking each fault and underlying reasons through a test. It may be very time-consuming and inefficient to find a root cause of the failure.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
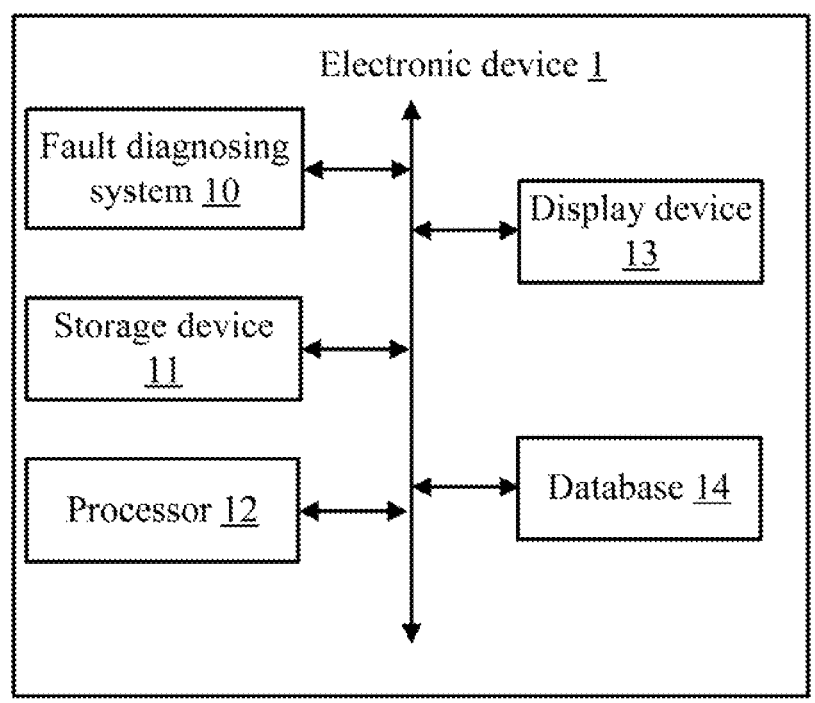
FIG. 1 is a block diagram of one embodiment of an electronic device including a fault diagnosing system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a block diagram of one embodiment of an electronic device 1. Depending on the embodiment, the electronic device 1 can include, but is not limited to, a fault diagnosing system 10, a storage device 11, at least one processor 12, a display device 13, and a database 14. The above components communicate with each other through a system bus. In at least one embodiment, the electronic device 1 can be a mobile phone, a tablet computer, a personal digital assistant, or any other suitable device. FIG. 1 illustrates only one example of the electronic device 1 that can include more or fewer components than illustrated, or have a different configuration of the various components in other embodiments.

In at least one embodiment, the storage device 11 can be a memory of the electronic device 1. In other embodiments, the storage device 11 can be a secure digital card, or other external storage device such as a smart media card.

The at least one processor 12 can be a central processing unit (CPU), a microprocessor, or other data processor chip that performs functions of the electronic device 1.

In at least one embodiment, the display device 13 can be a liquid crystal display (LCD) device or an organic light-emitting diode (OLED) display device. The display device 13 can display diagnosis results of the products.

In at least one embodiment, the database 14 can store fault types and underlying reasons or possible reasons for the same (fault reasons) in products. The number of the products is high. The fault reasons of the products can be divided into many levels according to the fault types. For example, the levels can include a first level, a second level, a third level, and so on. Each level of the fault reasons can include one or more reasons. The fault types and fault reasons of the products can be dynamically added to the database 14 as the products are produced. A user can record fault types and fault reasons and store the fault types and fault reasons into the database 14.

In at least one embodiment, a fault type may be that a target product cannot be recharged for example. When the fault type of the target product is that the product cannot be recharged, the reasons for such inability can be divided into first level reasons, second level reasons, and so on. The first level reasons can include a reason that a test device for the products was broken, that hardware element has failed, and that software of the product is malfunctioning. A probability of the reason that the test device was broken is 0.7. A probability of the reason that hardware element has failed is 0.2. A probability of the failed connecting cable reason is 0.6. A probability of the abnormal workstation reason is 0.4. When the first level reason is the hardware element failure, the second level reasons can include a broken motherboard as a reason, and that a battery of the product is worn out as an additional reason. A probability of the fault reason that the motherboard of the target product was broken is 0.6, and a probability of the worn-out battery as a fault reason is 0.4. When the first level reason is software failure, the second level reasons can include a reason that a script (e.g., Smokey script) is not working. A probability of such fault reason is 1.

Figure 2:
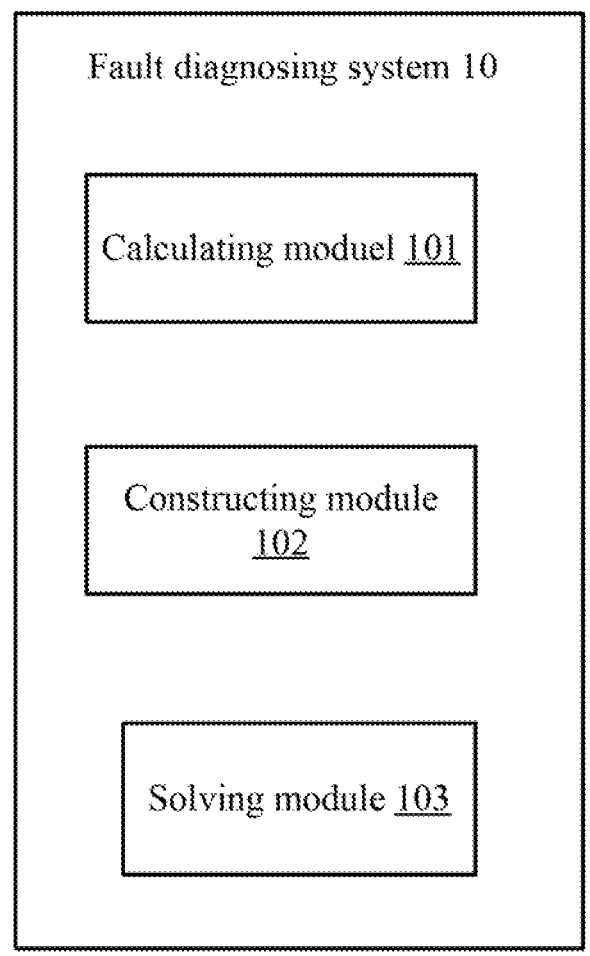
FIG. 2 is a block diagram of one embodiment of modules of the fault diagnosing system of FIG. 1.

FIG. 2 illustrates a block diagram of one embodiment of modules of the fault diagnosing system 10. In at least one embodiment, the fault diagnosing system 10 can include a calculating module 101, a constructing module 102, and a solving module 103. The modules 101-103 include computerized codes in the form of one or more programs that may be stored in the storage device 11. The computerized codes include instructions that are executed by the at least one processor 12.

Figure 3:
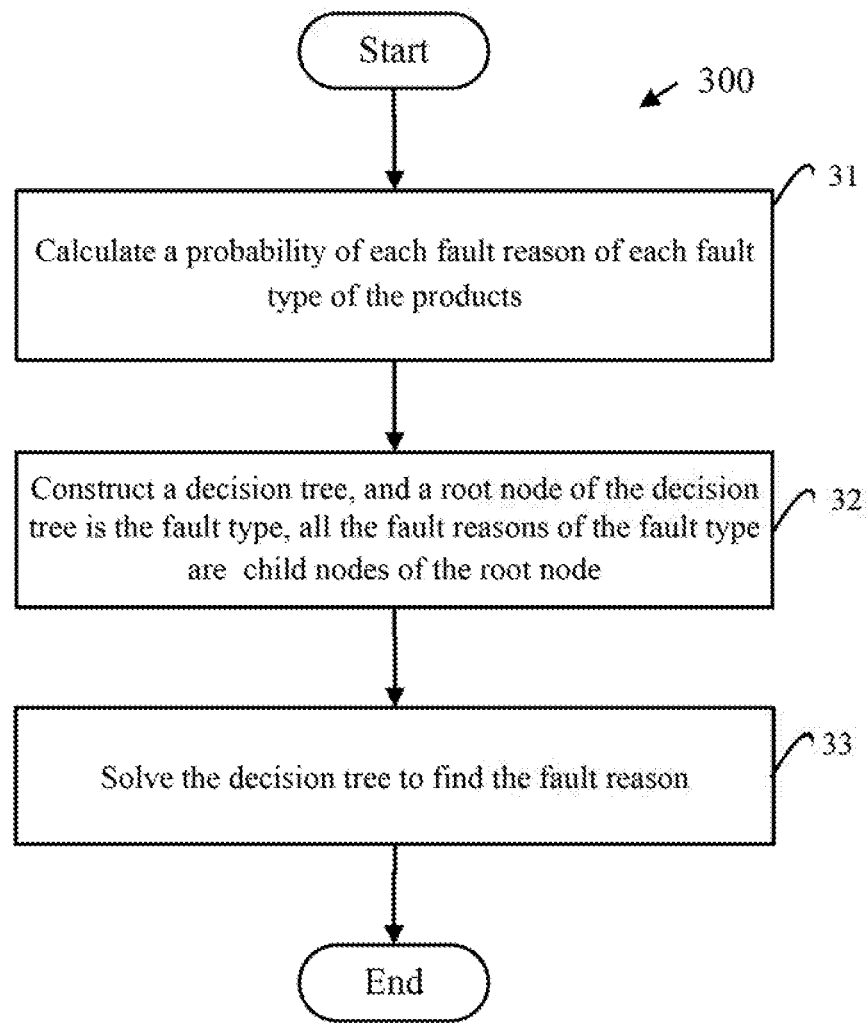
FIG 3 illustrates a flowchart of one embodiment of a method for diagnosing fault of the electronic device of FIG. 1.

FIG. 3 illustrates a flowchart which is presented in accordance with an example embodiment. The example method 300 is provided by way of example, as there are a variety of ways to carry out the method. The method 300 described below can be carried out using the configurations illustrated in FIG. 1, for example, and various elements of these figures are referenced in explaining example method 300. Each block shown in FIG. 3 represents one or more processes, methods, or subroutines, carried out in the example method 300. Additionally, the illustrated order of blocks is by example only and the order of the blocks can be changed according to the present disclosure. The example method 300 can begin at block 31. Depending on the embodiment, additional steps can be added, others removed, and the ordering of the steps can be changed.

At block 31, the calculating module 101 can calculate a probability of each fault reason of each fault type of the products. In at least one embodiment, the probability of each fault reason is a ratio between the number of times that each fault reason appears and total number of times that all the fault reasons appear in the corresponding level of fault reasons. For example, when the first level reasons include R1, R2, and R3, the number of the fault reason R1 which may appear in the first level reasons is n1, the number of the fault reason R2 is n2, and the number of the fault reason R3 is n3. The probability of the fault reason R1 is calculated by formula $$\frac{n1}{n1+n2+n3},$$

the probability of the fault reason R2 is calculated by formula $$\frac{n2}{n1+n2+n3},$$

and the probability of the fault reason R3 is calculated by formula $$\frac{n3}{n1+n2+n3}.$$

The calculation module 101 can dynamically update the probability of each fault reason of each fault type of the product as additional fault types and reasons are added into the database 14.

At block 32, the constructing module 102 can construct a decision tree. A root node of the decision tree is the fault type, and all the fault reasons of that fault type are child nodes of the root node.

In at least one embodiment, the constructing module 102 can determine a fault type when the product is faulty, and find first level fault reasons (e.g. R1, R2, and R3) of the fault type. The calculating module 101 can calculate the probability of the first level fault reasons. The constructing module 102 further can construct the first layer of the decision tree, the root node of the first layer of the decision tree being the fault type, and all the first level fault reasons R1, R2, and R3 being the child nodes of the first layer of the decision tree. The probabilities of each of the first level fault reasons R1, R2, and R3 are weightings of the child nodes of the first layer. The constructing module 102 further can find second level fault reasons corresponding to the first level fault reasons, and calculate the probabilities of the second level fault reasons. The constructing module 102 further can construct the second layer of the decision tree, the root node of the second layer of the decision tree being each of the first level fault reasons R1, R2, and R3, and the child nodes of the second layer of the decision tree being the second level fault reasons. The probabilities of the second level fault reasons can be set by the constructing module 102 as weightings of the child nodes of the second layer, and so on. The decision tree will continue to be constructed until there are no other fault reasons.

Figure 4:
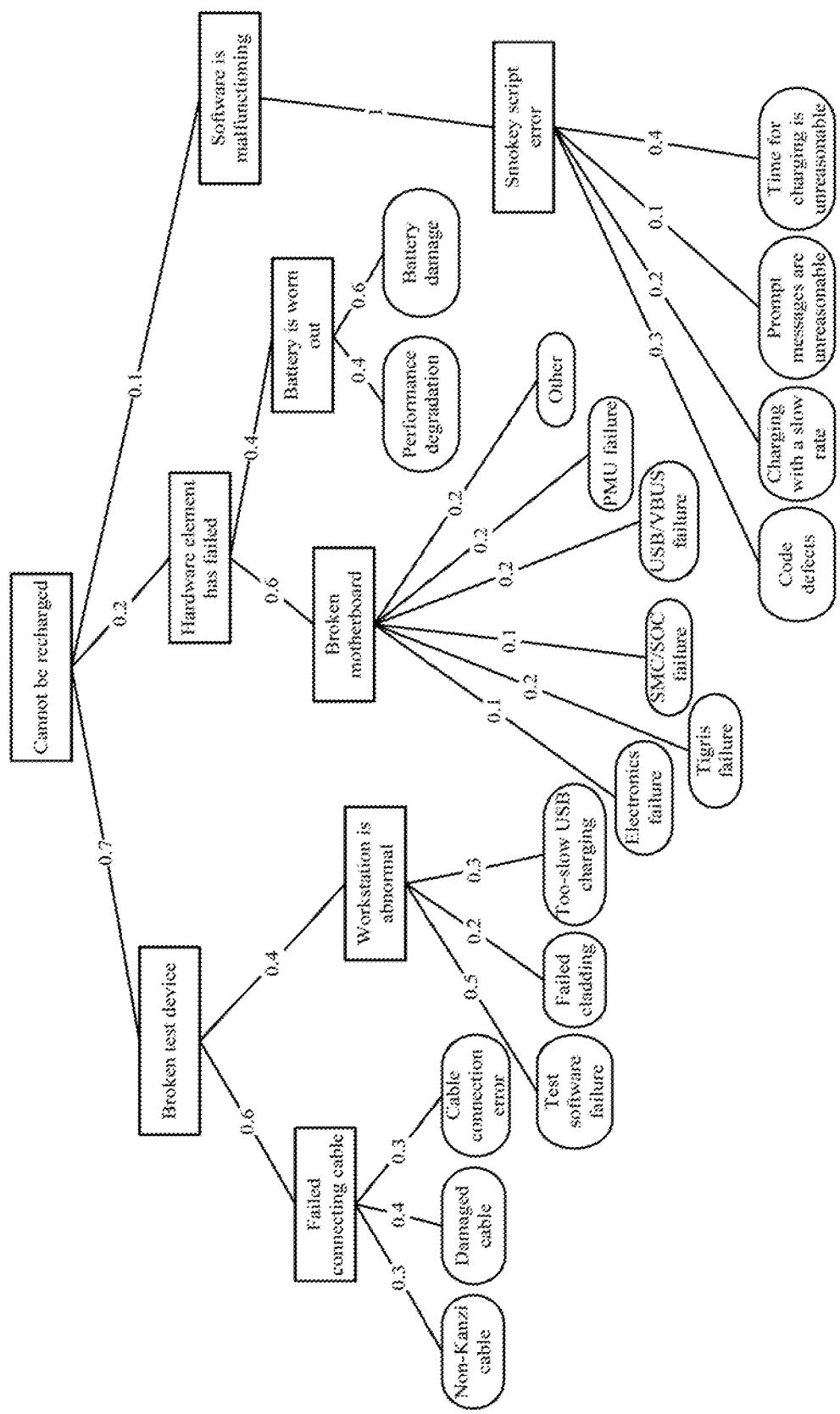
FIG. 4 illustrates an example of a decision tree that a fault type of a target product is cannot be rechargeable.

FIG. 4 illustrates a decision tree which fault type is the target product cannot be rechargeable. When the target product cannot be rechargeable, the fault reasons for why the target product cannot be rechargeable are divided into many levels. For example, the first level fault reasons include the reason that a test device for the products was broken, the reason that hardware of the products fails, and the reason that software of the products fails. The following text describes about a first branch of the decision tree. The first level fault reason of the first branch is that the test device for the products was broken. The constructing module 102 can construct the first layer of the first branch, the root node of the first layer of the first branch is that the target product cannot be rechargeable, the first level fault reason that the test device for the products was broken is the child node of the first layer of the first branch, the constructing module 102 can set the probability 0.7 of the first level fault reason as the weighting of the child node of the first layer of the first branch.

In at least one embodiment, when the first level fault reason is broken test device, the second level fault reasons corresponding to the first level fault reason are connecting cable failure, and abnormal workstation for the target product. The constructing module 102 can construct the second layer of the first branch of the decision tree. The root node of second layer of the first branch of the decision tree is broken test device, the child nodes of second layer of the first branch of the decision tree are the failed connecting cable, and the abnormal workstation. The constructing module 102 can set the probability 0.6 of the failed connecting cable as the weighting of the child node of the second layer of the first branch. The constructing module 102 can set the probability 0.4 of the abnormal workstation as the weighting of the child node of the second layer of the first branch.

In at least one embodiment, when the second level fault reason is failed connecting cable, the third level fault reasons corresponding to the second level fault reason include using a non-Kanzi cable as the fault reason, damaged cable as a fault reason, and connection of the cable wrongly as a fault reason. The constructing module 102 can construct the third layer of the first branch of the decision tree. The root node of third layer of the first branch of the decision tree is connecting cable failure, the child nodes of third layer of the first branch of the decision tree are the fault reasons of using non-Kanzi cable, damaged cable, and cable connection error. The constructing module 102 can set the probability 0.3 for using non-Kanzi cable as the weighting of the child node of the third layer of the first branch. The constructing module 102 can set the probability 0.4 for damaged cable as the weighting of the child node of the third layer of the first branch. The constructing module 102 can set the probability 0.3 for cable connection error as the weighting of the child node of the third layer of the first branch.

In at least one embodiment, when the second level fault reason is abnormal workstation, the third level fault reasons corresponding to the second level fault reason include test software failure, failed cladding, and too-slow USB charging. The constructing module 102 can construct the third layer of the first branch of the decision tree. The root node of third layer of the first branch of the decision tree is that abnormal workstation, and the child nodes of third layer of the first branch of the decision tree include software malfunction, cladding failure, and too-slow USB charging. The constructing module 102 can set the probability of 0.5 for software malfunction as the weighting of the child node of the third layer of the first branch. The constructing module 102 can set the probability of 0.2 for cladding failure as the weighting of the child node of the third layer of the first branch. The constructing module 102 can set the probability of 0.3 for too-slow USB charging as the weighting of the child node of the third layer of the first branch.

At block 33, the solving module 103 can solve the decision tree to find the fault reason, and display the fault reason on the display device 13.

In at least one embodiment, the solving module 103 can prune the decision tree to eliminate abnormal data. For example, the solving module 103 can set a predetermined probability value, and prune the branch of the decision tree when the probability of the branch is less than the predetermined probability value. The predetermined probability value can set by a user. The solving module 103 can calculate a probability value of each path of the decision tree by traversing the decision tree, and sort the probability values of all paths of the decision tree into a sequence of great to small, and select a top predetermined number of paths. Then the leaf nodes of the selected top predetermined number of paths correspond to the fault reason. The probability of each path of the decision tree forms the product of all the probabilities of all nodes of the path.

In at least one embodiment, the predetermined number of paths can be determined based on demand for the products. For example, when a user needs to find two fault reasons in the actual production, the solving module 103 can select two paths which have probability values and rank them first and second. The leaf node of the path of which the probability value is ranked first corresponds to a main reason of the fault type. The leaf node of the path of which the probability value is ranked second corresponds to a minor reason of the fault type. For example, in FIG. 4, when the predetermined probability is 0.2, the solving module 103 can prune the decision tree to eliminate the software malfunction, as the probability of such is less than the predetermined probability. When the predetermined number of paths is two, the solving module 103 can select two paths ranked first and second in terms of probability. For example, the probability of the first ranked path is 0.168, and the path includes the fault reasons as non-rechargeable product, test device failure, cable connection error, and damaged cable. The leaf node of damaged cable is the main fault reason why the product is not rechargeable. The probability of the first ranked path is 0.14, and the path includes the fault reasons as non-rechargeable product, test device failure, abnormal workstation, and software malfunction. The damaged cable leaf node is the minor reason for non-recharge ability.

In at least one embodiment, when the predetermined probability value is 0.2, the solving module 103 can prune the branch to remove software malfunction as a fault reason. When the predetermined number of paths is two, the solving module 103 can select two paths which have probability values and rank them first and second. The leaf node of the path of which the probability value is ranked first corresponds to a main reason of the fault type. The leaf node of the path of which the probability value is ranked second corresponds to a minor reason of the fault type.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A fault diagnosing method applied in an electronic device, the electronic device comprising a database that stores a plurality of fault types and reasons of a product, the method comprising:
   determining a fault type of the product and all the fault reasons corresponds to the determined fault type;
   calculating a probability of each fault reason;
   constructing a decision tree which a root node of the decision tree is the determined fault type and all the fault reasons are child nodes of the root node;
   setting a predetermined probability value, and pruning a branch of the decision tree when a probability of the branch is less than the predetermined probability value, wherein the probability of each path of the decision tree is equal to a product of all the probabilities of all nodes of the path;
   obtaining a plurality of probability values by calculating a probability of each path of the decision tree by traversing the decision tree;
   sorting the plurality of probability values of all paths of the decision tree into a sequence of great to small; and
   selecting a top predetermined number of paths, and the leaf nodes of the selected top predetermined number of paths correspond to the fault reasons of the product.

2. The method according to claim 1, further comprising:
   dividing all the fault reasons of the product into a plurality of levels according to the determined fault type.

3. The method according to claim 1, wherein the probability of each fault reason is a ratio between the number of times that each fault reason appears and total number of times that all the fault reasons appear in the corresponding level of fault reasons.

4. The method according to claim 2, wherein the step that constructing the decision tree comprising:
   finding first level fault reasons based on the database;
   calculating the probabilities of the first level fault reasons;

constructing a first layer of the decision tree, wherein the root node of the first layer of the decision tree is the determined fault type, all the first level fault reasons are the child nodes of the first layer of the decision tree, and set the probabilities of the first level fault reasons as weightings of the child nodes of the first layer of the decision tree;

finding second level fault reasons corresponds to the first level fault reasons;

calculating the probabilities of the second level fault reasons; and constructing the second layer of the decision tree, wherein the root node of the second layer of the decision tree are the first level fault reasons, the child nodes of the second layer of the decision tree are the second level fault reasons, and set the probabilities of the second level fault reasons as weightings of the child nodes of the second layer, and so on, the decision tree will be constructed until there are no other fault reasons.

5. An electronic device comprising:

a database that stores a plurality of fault types and reasons of a product;

a storage device;

at least one processor; and the storage device further stores one or more programs that, when executed by the at least one processor, cause the at least one processor to:

determine a fault type of the product and all the fault reasons corresponds to the determined fault type;

calculate a probability of each fault reason;

construct a decision tree which a root node of the decision tree is the determined fault type and all the fault reasons are child nodes of the root node;

set a predetermined probability value, and prune a branch of the decision tree when a probability of the branch is less than the predetermined probability value, wherein the probability of each path of the decision tree is equal to a product of all the probabilities of all nodes of the path;

obtain a plurality of probability values by calculating a probability of each path of the decision tree by traversing the decision tree;

sort the plurality of probability values of all paths of the decision tree into a sequence of great to small; and select a top predetermined number of paths, and the leaf nodes of the selected top predetermined number of paths correspond to the fault reasons of the product.

6. The electronic device according to claim 5, wherein the at least one processor further caused to:

divide all the fault reasons of the product into a plurality of levels according to the determined fault type.

7. The electronic device according to claim 6, wherein the probability of each fault reason is a ratio between the number of times that each fault reason appears and total number of times that all the fault reasons appear in the corresponding level of fault reasons.

8. The electronic device according to claim 6, wherein the step that construct the decision tree comprising:

finding first level fault reasons based on the database;

calculating the probabilities of the first level fault reasons;

constructing a first layer of the decision tree, wherein the root node of the first layer of the decision tree is the determined fault type, all the first level fault reasons are the child nodes of the first layer of the decision tree, and set the probabilities of the first level fault reasons as weightings of the child nodes of the first layer of the decision tree;

finding second level fault reasons corresponds to the first level fault reasons;

calculating the probabilities of the second level fault reasons; and constructing the second layer of the decision tree, wherein the root node of the second layer of the decision tree are the first level fault reasons, the child nodes of the second layer of the decision tree are the second level fault reasons, and set the probabilities of the second level fault reasons as weightings of the child nodes of the second layer, and so on, the decision tree will be constructed until there are no other fault reasons.

9. A non-transitory storage medium having stored thereon instructions that, when executed by a processor of an electronic device, causes the processor to perform a fault diagnosing method, the electronic device comprising a database that stores a plurality of fault types and reasons of a product and a storage device, wherein the method comprises:

determining a fault type of the product and all the fault reasons corresponds to the determined fault type;

calculating a probability of each fault reason;

constructing a decision tree which a root node of the decision tree is the determined fault type and all the fault reasons are child nodes of the root node;

setting a predetermined probability value, and pruning a branch of the decision tree when a probability of the branch is less than the predetermined probability value, wherein the probability of each path of the decision tree is equal to a product of all the probabilities of all nodes of the path;

obtaining a plurality of probability values by calculating a probability of each path of the decision tree by traversing the decision tree;

sorting the plurality of probability values of all paths of the decision tree into a sequence of great to small; and selecting a top predetermined number of paths, and the leaf nodes of the selected top predetermined number of paths correspond to the fault reasons of the product.

10. The non-transitory storage medium according to claim 9, further comprising:

dividing all the fault reasons of the product into a plurality of levels according to the determined fault type.

11. The non-transitory storage medium according to claim 10, wherein the probability of each fault reason is a ratio between the number of times that each fault reason appears and total number of times that all the fault reasons appear in the corresponding level of fault reasons.

12. The non-transitory storage medium according to claim 10, wherein the step that constructing the decision tree comprising:

finding first level fault reasons based on the database;

calculating the probabilities of the first level fault reasons;

constructing a first layer of the decision tree, wherein the root node of the first layer of the decision tree is the determined fault type, all the first level fault reasons are the child nodes of the first layer of the decision tree, and set the probabilities of the first level fault reasons as weightings of the child nodes of the first layer of the decision tree;

finding second level fault reasons corresponds to the first level fault reasons;

calculating the probabilities of the second level fault reasons; and constructing the second layer of the decision tree, wherein the root node of the second layer of the decision tree are the first level fault reasons, the child nodes of the second layer of the decision tree are the second level fault reasons, and set the probabilities of the second level fault reasons as weightings of the child nodes of the second layer, and so on, the decision tree will be constructed until there are no other fault reasons.

* * * * *